(12) United States Patent
Banister et al.

(10) Patent No.: US 8,572,149 B2
(45) Date of Patent: Oct. 29, 2013

(54) APPARATUS AND METHODS FOR DYNAMIC DATA-BASED SCALING OF DATA SUCH AS STAGED FAST FOURIER TRANSFORM (FFT) WHILE ENHANCING PERFORMANCE

(75) Inventors: Brian C. Banister, San Diego, CA (US);
Surendra Boppana, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 861 days.

(21) Appl. No.: 12/732,135

(22) Filed: Mar. 25, 2010

(65) Prior Publication Data
US 2010/0250636 A1 Sep. 30, 2010

Related U.S. Application Data

(60) Provisional application No. 61/164,400, filed on Mar. 28, 2009.

(51) Int. Cl.
*G06F 7/60* (2006.01)

(52) U.S. Cl.
USPC ........... 708/404; 708/400; 708/403; 708/405; 708/406; 708/407; 708/409

(58) Field of Classification Search
USPC .................. 708/400, 403–407, 409
See application file for complete search history.

(56) References Cited

U.S. PATENT DOCUMENTS

| | | | |
|---|---|---|---|
| 4,899,301 A * | 2/1990 | Nishitani et al. | 708/404 |
| 5,835,392 A * | 11/1998 | Dulong et al. | 708/404 |
| 7,024,442 B2 * | 4/2006 | Yamamoto et al. | 708/404 |
| 7,555,511 B2 * | 6/2009 | Steinberg | 708/404 |
| 8,218,426 B2 * | 7/2012 | Sampath et al. | 370/210 |
| 2004/0143616 A1 | 7/2004 | Kang | |
| 2007/0162533 A1 * | 7/2007 | Wada | 708/404 |
| 2008/0071848 A1 | 3/2008 | Baireddy et al. | |
| 2008/0215656 A1 * | 9/2008 | Hafuka et al. | 708/404 |

FOREIGN PATENT DOCUMENTS

| | | |
|---|---|---|
| WO | WO0007114 | 2/2000 |
| WO | WO0073872 | 12/2000 |

OTHER PUBLICATIONS

Bingham, J. A. C., "Appendix C: Efficient Hardware Implementations of FFT Engines", in "ADSL, VDSL, and Multicarrier Modulation", John Wiley & Sons, Inc., 2001.*
International Search Report and Written Opinion—PCT/US2010/028944, International Search Authority—European Patent Office—Aug. 4, 2010.

* cited by examiner

*Primary Examiner* — Tammara Peyton
(74) *Attorney, Agent, or Firm* — Stanton Braden

(57) ABSTRACT

Disclosed are apparatus and methods for dynamic data-based scaling of data. The disclosed methods and apparatus involve storing one or more input data samples, which are to be scaled and input to a processing function such as a Fast Fourier Transform. A scaling value operable for scaling the one or more data samples is determined based on the one or more input data samples, and then the stored data samples are scaled based on the computed scaling value when read out of storage prior to the processing function. The scaling of data based on the input data allows the data to be scaled dynamically, not statically, and ensures that the data fits within a desired bit width constraint of the processing function thereby economizing processing resources.

31 Claims, 7 Drawing Sheets

APPARATUS AND METHODS FOR DYNAMIC DATA-BASED SCALING OF DATA SUCH AS STAGED FAST FOURIER TRANSFORM (FFT) WHILE ENHANCING PERFORMANCE

CLAIM OF PRIORITY UNDER 35 U.S.C. §119

The present Application for Patent claims priority to Provisional Application No. 61/164,400 entitled "APPARATUS AND METHODS FOR DYNAMIC DATA-BASED SCALING OF DATA" filed Mar. 28, 2009, and assigned to the assignee hereof and hereby expressly incorporated by reference herein.

BACKGROUND

1. Field

The present disclosure relates generally to apparatus and methods for dynamic data-based scaling of data, and more specifically to apparatus and methods for dynamic scaling of data stored in a memory based on the data itself, such as in a Fast Fourier Transform (FFT) computation or other iterative processing computations of known scaling to minimize the bit-width of the data path.

2. Background

Fourier transform computation is a part of all Orthogonal Frequency Division Multiplexed (OFDM) based communication systems. In particular, the Fourier transform of an input sequence is typically computed by employing Fast Fourier Transform (FFT) algorithms. This FFT operation can be computationally expensive in a wireless device in terms of both power consumption and area in a computation circuit such as an ASIC. The design of the data path for FFT computation is often complicated and needs to accommodate a very high dynamic range (e.g., as high as 35-45 dB), which is a result of channel variation, in-band and out-of-band jammers, etc. A solution for accommodating this high dynamic range could include a static scaling scheme such as a Digital controlled Variable Gain Amplifier (DVGA) multiplication of the input sequence before the FFT computation. Such a scheme would need to take into consideration variable network loading and unknown frequency domain power distributions, for example. However, additional headroom would have to be allocated in the bit-widths to account for this dynamic range, thus tending away from minimization of the computation bit width of the FFT.

It is further noted that FFT algorithms typically transform an input sequence by decomposing the input sequence (typically a power of 2) into smaller Fourier transforms that are a power of two (2). Successive computation of these smaller Fourier transforms (also called butterflies) engenders a larger FFT. Additional headroom would also need to be provided for this dynamic range. Thus, optimization of the FFT computation block is an important design consideration. Accordingly, a need exists for minimizing the computation bit-width of a data path for an iterative process of known scaling output, such as a staged FFT algorithm, while still providing adequate bit-width to ensure adequate performance.

SUMMARY

According to an aspect, a data based scaling apparatus is disclosed having an input for receiving one or more data samples. The apparatus further includes a storage device configured to store at least one of the one or more input data samples, and a scaling computation unit configured to compute a scaling value operable for scaling the one or more data samples, wherein the scaling value is based on the one or more input data samples. Moreover, the apparatus includes a scaling unit configured to scale the one or more data samples read out of the memory device based on the computed scaling value computed from the input one or more data samples.

According to another aspect, a method for data-based scaling is disclosed. The method includes storing at least one of the one or more input data samples. Additionally, the method includes computing a scaling value operable for scaling the one or more data samples, wherein the scaling value is based on the one or more input data samples. Finally, the method includes scaling the one or more stored data samples based on the computed scaling value.

According to yet another aspect, an apparatus for data-based scaling of data is disclosed having means for storing at least one of the one or more input data samples. The apparatus further includes means for computing a scaling value operable for scaling the one or more data samples, wherein the scaling value is based on the one or more input data samples. Also, the apparatus includes means for scaling the one or more stored data samples based on the computed scaling value.

According to still another aspect, a computer program product comprising:

computer-readable medium is disclosed. The computer-readable medium includes code for causing a computer to store at least one of the one or more input data samples, and code for causing a computer to compute a scaling value operable for scaling the one or more data samples, wherein the scaling value is based on the one or more input data samples. Additionally, the medium includes code for causing a computer to scale the one or more stored data samples based on the computed scaling value.

According to yet one more aspect, a communication apparatus is disclosed having at least one processor. The at least one processor is configured to receive one or more data samples and to store at least one of the one or more input data samples in a memory. Further, the process in configured to compute a scaling value operable for scaling the one or more data samples, wherein the scaling value is based on the one or more input data samples. Still further, the a processor is configured to scale the one or more stored data samples based on the computed scaling value.

DETAILED DESCRIPTION

The techniques described herein may be used for various wireless communication networks such as Orthogonal Frequency Division Multiplexed (OFDM) Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art. It is also noted that the concepts disclosed herein are more broadly applicable to other technologies beyond just wireless communications, but to any system benefitting from a dynamic scaling of data.

The word "exemplary" is used herein to mean "serving as an example, instance, or illustration." Any embodiment described herein as "exemplary" is not necessarily to be construed as preferred or advantageous over other embodiments.

Figure 1:
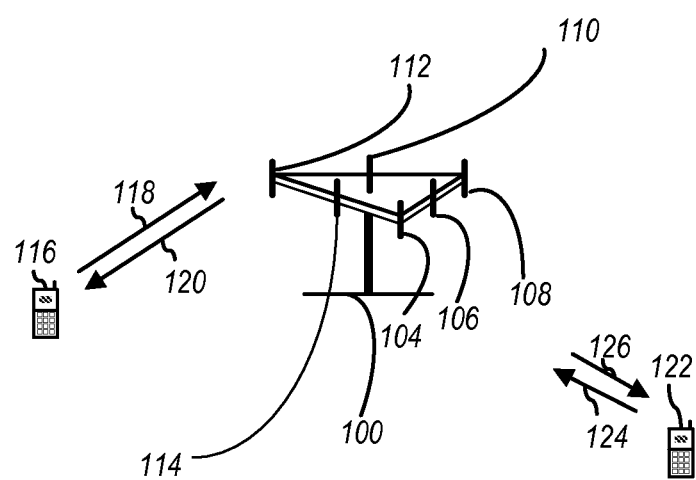
FIG. 1 illustrates a multiple access wireless communication system in which the present apparatus and methods may be utilized.

Referring to FIG. 1, an example of a multiple access wireless communication system in which the present methods and apparatus may be employed is shown. An access point 100 (AP) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over a downlink or forward link 120 and receive information from access terminal 116 over an uplink or reverse link 118. Access terminal 122 is in communication with antennas 106 and 108, where antennas 106 and 108 transmit information to access terminal 122 over forward link 126 and receive information from access terminal 122 over reverse link 124. In an FDD system, communication links 118, 120, 124 and 126 may use different frequency for communication. For example, forward link 120 may use a different frequency than that used by reverse link 118.

Each group of antennas and/or the area in which they are designed to communicate is often referred to as a sector of the access point. In an aspect, antenna groups each are designed to communicate to access terminals in a sector of the areas covered by access point 100.

An access point may be a fixed station used for communicating with the terminals and may also be referred to as an access point, a Node B, or some other terminology. An access terminal may also be called an access terminal, user equipment (UE), a wireless communication device, terminal, access terminal or some other terminology.

Figure 2:
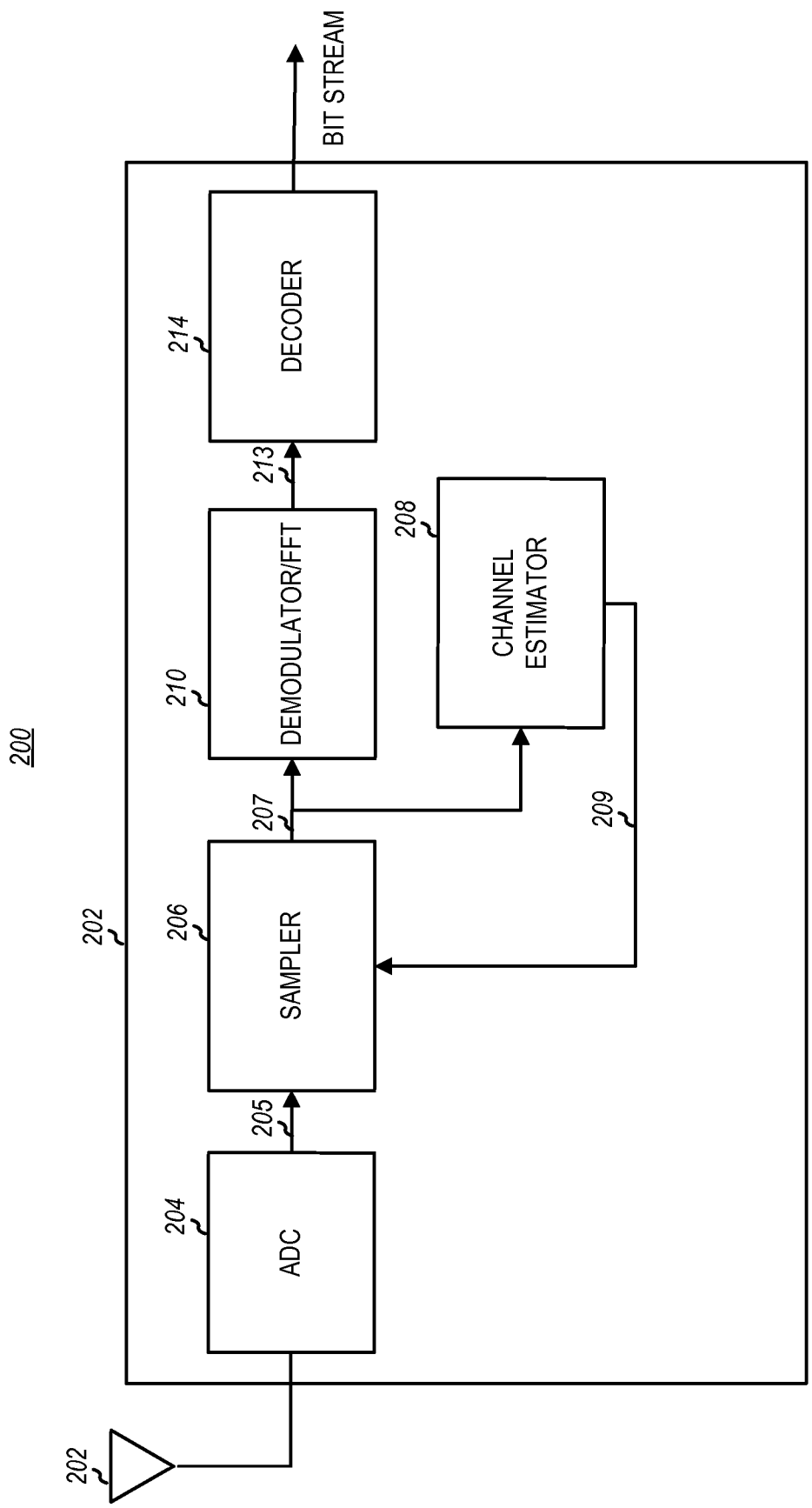
FIG. 2 is a block diagram of a receiver portion of a transceiver device in which the methods and apparatus for dynamic data-based scaling of data may be employed.

FIG. 2 is a block diagram of a receiver portion of a transceiver, such as may be embodied in AT 122 or AP 100 in FIG. 1, which may employ any or all of the presently disclosed methods and apparatus for dynamic data-based scaling of data. As illustrated, a receiver portion of a transceiver 200 includes an antenna 202 that receives a transmitted wireless signal. The antenna delivers the signal to an analog-to-digital (A/D) converter 204 that converts the analog signal to a digital signal. A/D converter 204 outputs the digital signal 205 to a sampler 206. Sampler 206 samples subcarriers or bins within the signal 205. The output of sampler 206, which is the synchronized digital signal 207, is input to both a channel estimator 208 and a demodulator/FFT 210. The channel estimator 208 performs coherent detection, as an example, using pilot tones inserted by the transmitter (not shown) into the symbols of the digital signal. Estimator 208 performs channel estimation that yields channel estimate of the channel. This channel estimate, or related information is output (209) by channel estimator 208 to sampler 206 for setting the sampling window of the channel for samples sent to the demodulator/FFT 212.

As shown in FIG. 2, the output of the sampler 206 also feeds the signal 207 to a demodulator/FFT 210, for demodulating the signal 207 through FFT computation, which was modulated by the transmitter (not shown) according to one of a number of known techniques. After demodulation, the resultant demodulated signal 213 is decoded by decoder 214 and output as a serial bit stream for use by a mobile communication device in which the transceiver is housed, such as an access terminal or mobile phone device, as examples.

It is noted that circuit 210, including an FFT computation block, may be implemented as hardware, software, firmware, or combinations thereof within a transceiver apparatus, such as transceiver 200. Additionally, in the case of a software implementation, the transceiver 200 could include an integrated circuit, such as an Application Specific Integrated Circuit (ASIC) including or interfacing with a computer readable medium having instructions stored thereon, the stored instructions, when executed by a processor, causing the processor to perform the methods described herein.

As mentioned before, scaling of data during computation of an FFT is an important consideration in the design of bit-widths for the internal butterfly unit. An FFT design needs to take into consideration the dynamic range of the data corresponding to frequency domain channel variation, in-band- and out-of-band jammers. A dynamic scaling scheme at the output of each butterfly computation can normalize every stage in an optimal saturation avoiding manner, thus minimizing the bit-width of the data path. Accordingly, apparatus and methods are disclosed that afford dynamic scaling of data for iterative processes, such as an FFT computation, where the scaling is based on the input data (or last iteration of computed data being fed back to the input). One such apparatus is illustrated in FIG. 3.

Figure 3:
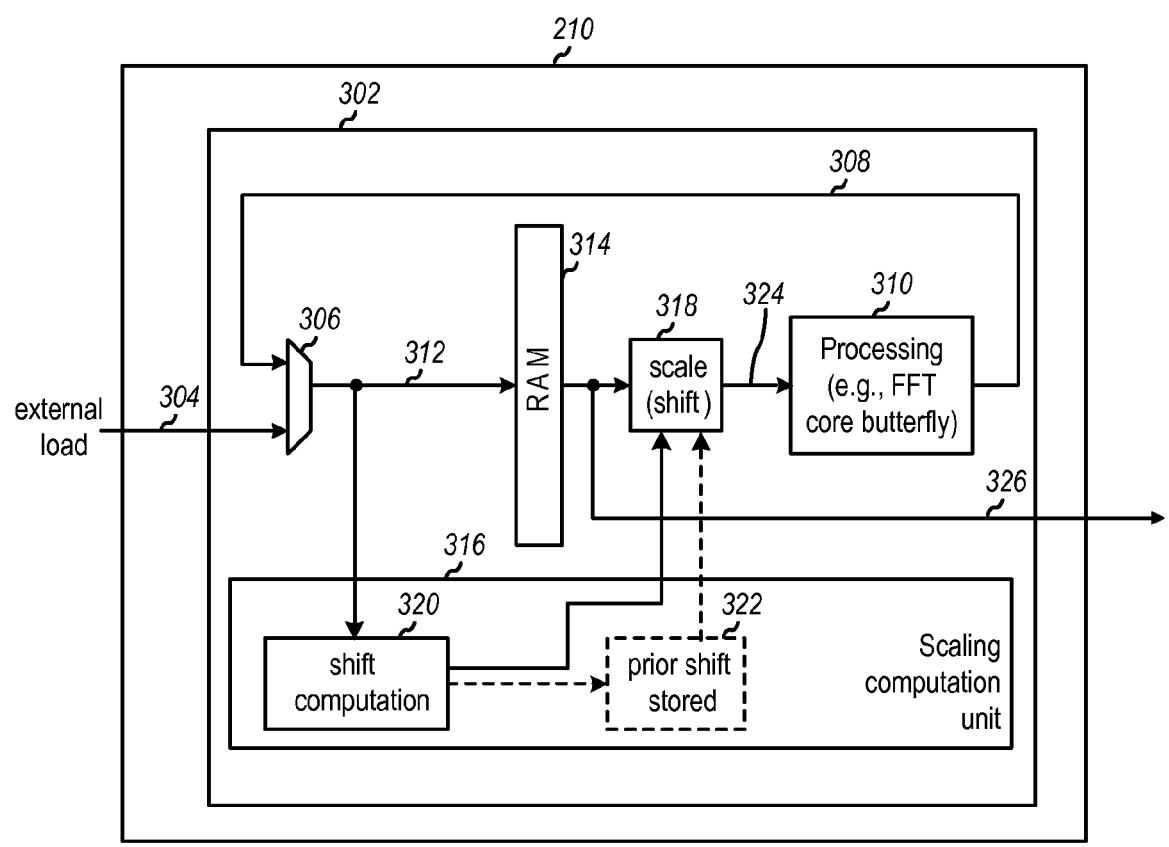
FIG. 3 is a block diagram of an apparatus employing dynamic data-based scaling of data in an processing block of a transceiver as one example.

FIG. 3 shows an apparatus 302 that may be used in an FFT (e.g., demodulator/FFT 210 of FIG. 2) for dynamic scaling of data in the context of FFT computation. Apparatus 302 includes an input of an external load or one or more data samples 304, which are input to a multiplexer 306 or similar input device that can select to output from among two or more inputs. In the illustrated example, multiplexer 306 selects between an initial external load 304 or the output 308 of a data processing unit (e.g., an FFT core butterfly unit) 310 fed back in an iterative or recursive process. Output 312 of multiplexer 306 is fed to a memory (RAM 314). Thus, RAM 314 initially stores unmodified samples (i.e., the initial external load 304) directly from input device and subsequently stores computed FFTs fed back from processing unit 310 via multiplexer 306 when selected to output the input 308.

The output 312 of multiplexer 306 is also input to a scaling computation unit 316 that functions to effect dynamic scaling of the next stage data input to the processing unit 310 based on the samples input for processing (e.g., output 312). In the example of FIG. 3, the scaling computation unit determines a scaling factor that is used by a scaling unit 318 to scale samples read out of RAM 314 prior to processing by the processing unit 310.

In an aspect, the scaling computation unit 316 may compute a value or values that are used for scaling through bit shifting samples read out of the RAM 314 for a system using binary input samples (e.g., power of 2 scale values). Accordingly, unit 316 may include a shift computation block or function 320 that determines how many bits to shift the samples read output of RAM 314 in order to ensure that the samples input to the processing unit 310 are scaled by scaling unit 318 to a predetermined or desired bit width of an input 324 to unit 310.

The shift computation block 320 may be configured to first determine a maximum among the maximums of real and imaginary absolute values over all of the input data samples (i.e., the data samples are typically complex numbers). Thus in this example, a maximum of all the input data samples is determined in block 320. After a maximum is determined, block 320 may be then further configured to determine a smallest shift needed to ensure that the numbers input to unit 310 fit within the predetermined bit width of input 324. Assuming power of 2 scale values, the shift computation unit would determine the number of right shifts needed to be performed on data read from RAM 314 to ensure that the output of scaling unit 318 will be within the predefined bit width limitations of input 324. Each right shift in a power of 2 scale will equal division by 2 (i.e., multiplication by $2^{-n}$ where n is the number of shifts right). Thus, for example, assuming a bit width of the input is 11 bits (10 bits and 1 signed bit), the range of values would be from −1024 to 1023. Accordingly, if block 320 determines a maximum value for an iteration of data input 312 to be 2046, the scaling computation unit 316 would communicate to unit 318 a shift right of one. Thus, the data would be shifted once to the right (i.e. divided by 2), ensuring that the maximum value output by unit 318 will be 1023 (i.e., 2046/2=1023). It is noted here that scaling the data samples upward using left shifts is also contemplated, which is the equivalent of multiplication by $2^n$ where n is the number of left shifts.

In an aspect, the calculation result of block 320 may be input to a prior shift stored block 322 such that the prior shift value may be compared (or some other suitable operation such as subtraction of the two values) with the present calculated shift value of block 312. The result of the operation of block 322 is input to the scaling or shifting block 318. In another aspect the computed scaling value computed by unit 316 is a shift value that is limited to a smallest amount to ensure values or numbers of the samples will fit within the predetermined range of values (e.g., from −1024 to 1023 for a 11-bit FFT input). Thus, if a maximum value of the input data is 2046 (i.e., a 12 bit number), as in the example above, the minimum shift is simply one right shift to keep the scaled values within the predefined limit (e.g., 11 bits). However, if the maximum value is greater than 2048 (i.e., 13 bits or greater), the shift number will be at least two (e.g., divide by four (4) in a scale power of two (2) system) to ensure that the data fits the predetermined bit width of the input 324 to the processing block 310.

In the particular implementation shown in FIG. 3, the computed FFTs stored in RAM 314 may also be output via output 326 to other devices, such as a decoder (e.g., decoder 214), or for further processing steps in demodulation within demodulator/FFT 210). During the FFT butterfly computation or other data computation at each stage by apparatus 302, the maximum magnitude is evaluated as the output 320 of the unit 318. Aspects of the input data, such as the maximum value, are used to compute the scaling that is applied to the input of the next stage; hence a dynamic data-based scaling of the data or scaling as a function of the input data. It is noted that the scaling is simplified by utilizing properties of binary arithmetic, such as shifting operations to divide by powers of two, which reduces computational complexity and increases computation speed.

Figure 4:
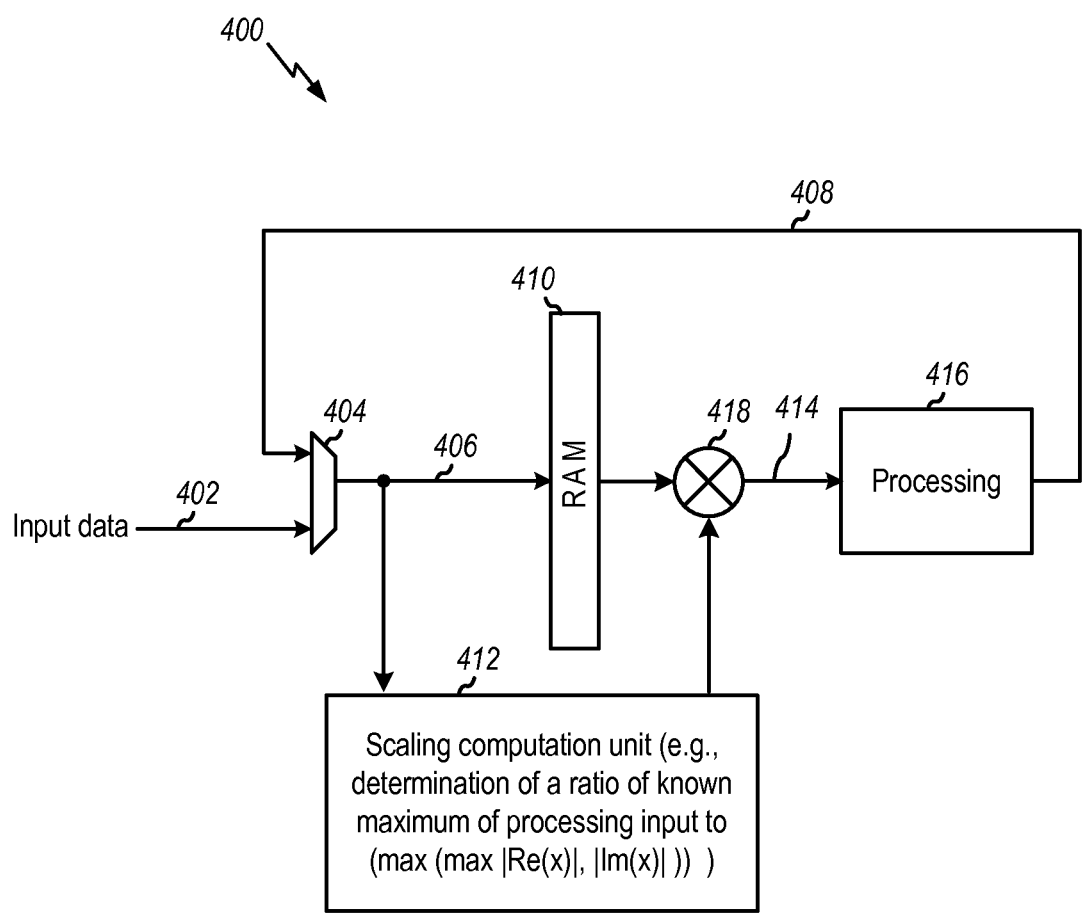
FIG. 4 is a block diagram of another exemplary apparatus for dynamic data-based scaling of data in an iterative or recursive process.

It also contemplated that the presently disclosed apparatus and corresponding methodologies could be applied to any system where iterative predetermined computation is performed with a known scaling amount (the term "known scaling" including known gain), with one or more iterations such as is known in FFT operations (e.g., radix 2, radix 4 butterfly stages of an FFT). Accordingly, FIG. 4 illustrates a more broadly envisioned example of the presently disclosed apparatus for data-based scaling of data that may be applied to any iterative computation. As illustrated, an apparatus 400 includes an input 402 to a multiplexer 404 or similar functionality to effect selective output 406 either input of data at particular times or recursive or iterative data 408.

The output 406 is stored in a memory device 410, which may be a RAM or other suitable storage device. The data on output 406 is also input to a scaling computation unit configured to determine a scaling value for scaling the data when read out of the memory 401 for processing. Unit 412 effects a scaling function that is based on the input data that then subsequently is used to scale that data. In an aspect, if a bit width of an input 414 to a processing algorithm 416 is limited to a predetermined particular value (e.g., 11 bits), then the scaling computation unit functions to ensure that the scaling value computed will scale a largest value of the data to fit within the bit width limit. As discussed in the example of FIG. 3, an efficient means to effect scaling is to determine a number of shifts in a binary system to scale the data to within the predetermined range. In the present example, however, a precise calculation may alternatively be used where the maximum of data input is determined, and then used to calculate a ratio by which the data input to the processing is multiplied to ensure that even the largest value will be scaled to within the predetermined range. Accordingly, FIG. 4 shows a multiplier 418 which is used to multiply data read out of memory 410 by the scaling value or ratio output by unit 412.

In a particular example, the function may be expressed as $$y = x \cdot \frac{\text{maximum processing input}}{\max(\max|\text{Re}(x)|, |\text{Im}(x)|)}$$

where y is the output of multiplier 418, x is the input data value, and Re(x) and Im(x) are real and imaginary values of stored data samples (i.e., 406 input to scaling unit 412). The term "maximum processing input" represents the predetermined maximum bit width of the processing input (e.g., 416). Such precisely determination, however adds computational complexity since a multiplier is used, rather than a simply shift as in the example of FIG. 3.

Figure 5:
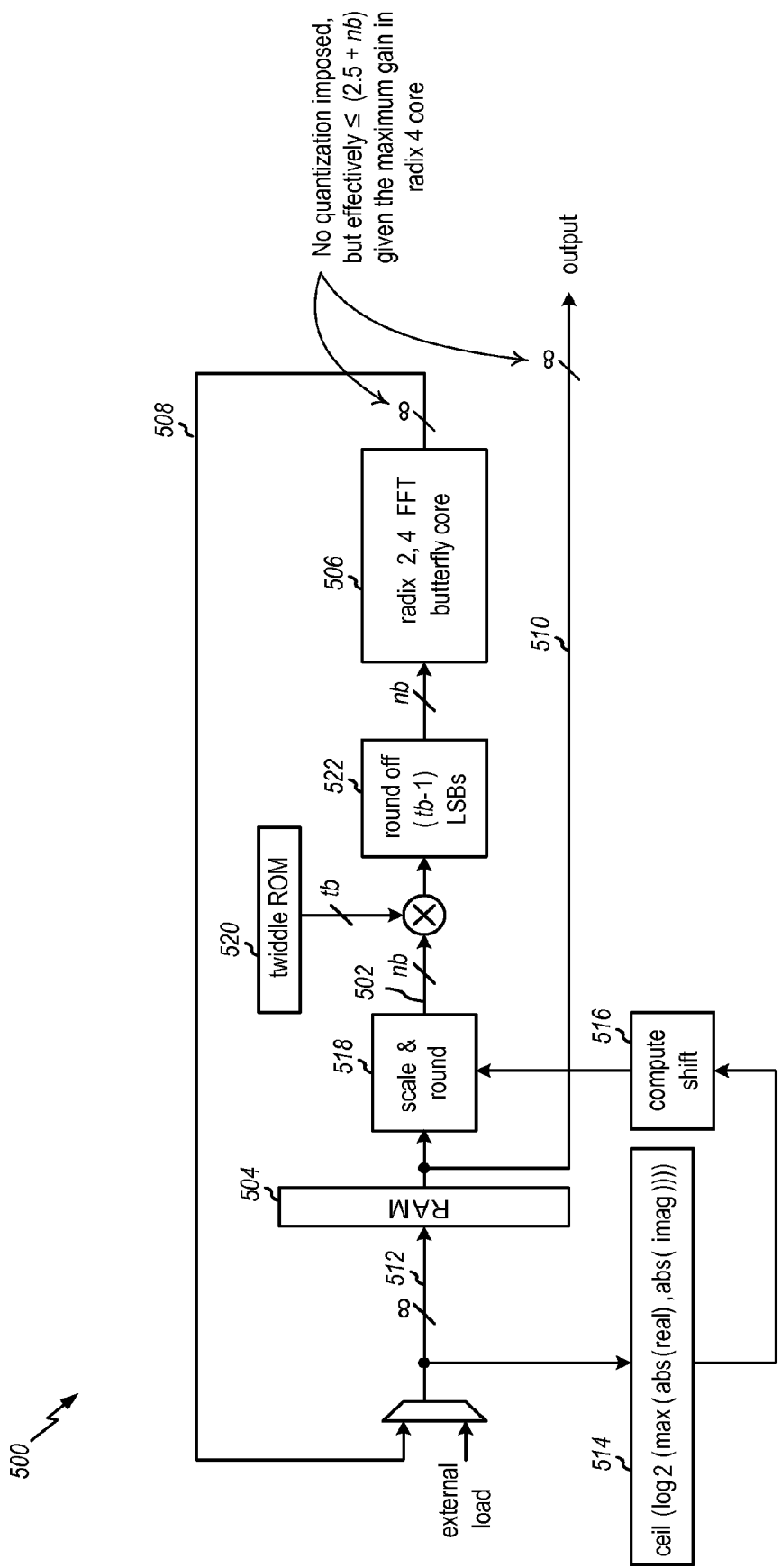
FIG. 5 is another block diagram of an apparatus employing dynamic data-based scaling of data in an FFT block of a transceiver.

FIG. 5 illustrates a particular implementation of the present apparatus for data-based scaling of data in the context of a portion of a demodulator 500 that may be employed in a communication device, similar to the apparatus illustrated in FIG. 3. In this example, the input to an FFT block 502 is a predefined nb bits wide (e.g., a bit width nb=14). This size may also be the width of the RAM 504 used to store the output of each of the FFT stages, although not necessarily so. Accordingly, the symbol ∞ is used in FIG. 5 to indicate that the size of the RAM 504 need not necessarily be equal to that of FFT bit-width, and may be chosen based on other considerations like the statistics of input data.

The Fourier transform (e.g., FFT butterfly core 506) of the input vector is computed by breaking it down into radix-4 or radix-2 butterflies. When there is a large spread of magnitudes in the frequency domain (worst case), this spread increases by a factor of radix size at each stage (i.e., a known scaling or gain for a given radix size). Assuming that quantization of the output 508 (or final output 510) is not desired, the last stage of FFT should, in such a case, have the largest radix size (e.g., radix 4). Although no quantization is imposed on the output, effectively it will be less or equal to (2.5+nb) given the maximum gain in radix 4 core, for example.

It is noted that the input samples 512 to RAM 504 are fed to a computation block 514 to compute the ceiling or round up of the log 2 (i.e., a maximum) of the maximum of the absolute values of the real and imaginary portions of a sample data (e.g., computed by ceil($\log_2$(max(abs(real), abs(imag))))). It is noted that this maximum value is a rounded up base 2 logarithm value. Thus, for example, given sample data 512 having a maximum value of 3000, the computation of block 514 would yield a maximum value of 12 (i.e., the $\log_2$(3000) =11.55, which rounded up is 12). The maximum value computed by block 514 is then input to a shift compute block 516 that computes a shift value to ensure that the data input (502) to the FFT 506 is within the predefined bit width nb. In an aspect, the shift computation of block 516 could simply be a difference between the computed value of block 514 and the $\log_2$ of the maximum value predefined for input 502 to yield an n number of shifts. Thus, given the above example where the maximum value yields a 12 and assuming the maximum range of input 502 from −1024 to 1023, the computed shift would be 12−$\log_2$(1024) or 12−10=2. In this case, two (2) right shifts would be communicated to a scale and round block 518 positioning prior to input 502 to scale the data read from RAM 504 into the FFT 506. As mentioned before, right shifting is equivalent to multiplication by $2^{-n}$ in a binary system. In the example, a right shift of 2 would scale the maximum value of 3000 to 750 (i.e., 3000/4), ensuring that the bit width of input 502 is not exceeded.

It is noted that the inter-stage storage (i.e., scale and round 512, and input to FFT 502) is quantized to nb (node bits) signed bits. This quantization is also applied to the output of a twiddle factor multiplication. Twiddle factors (output of twiddle ROM 520) are quantized to tb (twiddle bits) signed bits, which are multiplied with nb and rounded off by tb−1 least significant bits (LSBs) as indicated by block 522. The radix-2 and radix-4 butterfly computations are performed in floating point.

In one exemplary simulation scenario, the simulation results showed that the apparatus of FIG. 5 was able to provide adequate FFT processing performance with an internal FFT processing bit width of 10-11 bits. Further, the twiddle path can be reduced further compared to the node bits without affecting the performance. Also, it was noted that the FFT RAM 504 used for storing the inter-stage output was preferably sized at least 2-bits larger than the processing bit width to accommodate for the maximum bit growth during the radix-4 butterfly computation, but not limited to such.

Figure 6:
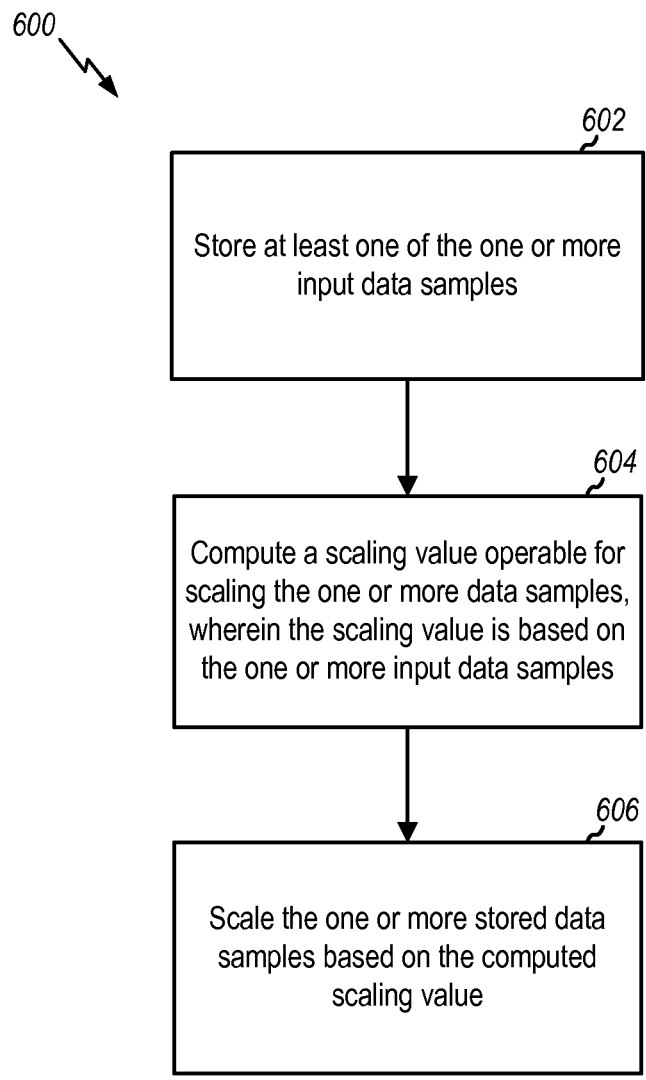
FIG. 6 is a flow diagram of a method for data-based scaling of data.

FIG. 6 illustrates a method 600 for data-based scaling that may be utilized in the apparatus of FIGS. 3-5 or similar apparatus performing an iterative process with known scaling or gain. Method 600 includes a process 602 storing at least one of the one or more input data samples, such as in a memory unit (e.g., units 314, 410, or 504). Method 500 also includes a process 604 for computing a scaling value operable for scaling the one or more data samples, wherein the scaling value is based on the one or more input data. It is noted that the computation of the scaling value may be performed in parallel with storing the one or more data samples performed in block 602. For example, while data is input to the memory, a maximum value computation may be simultaneously performed as data is received. In particular, if a maximum value is being determined as discussed previously the scaling computation units may continuously be keeping a measure of the absolute values of the data samples to find the maximum. It is noted that the process of block 604 may be effected by units 316, 412, or 514 discussed before. Additionally, the process 604 may include determining a shift value in certain aspects, and thus be also implemented with units 320 or 516, as two examples.

Finally, method 600 includes the process 606 of scaling the one or more stored data samples based on the computed scaling value determined in process 604. It is noted that in certain aspects scaling may be performed through shifting (and rounding in certain cases), while in other aspects through a multiplication operation (e.g., multiplier 418). It is noted that method 600 is repeatable as data samples continue to be either received as external load, or through iterations being fed back out of a processing unit, such as processing unit 416 in the example of FIG. 4, or FFTs in the examples of FIGS. 3 and 5.

Figure 7:
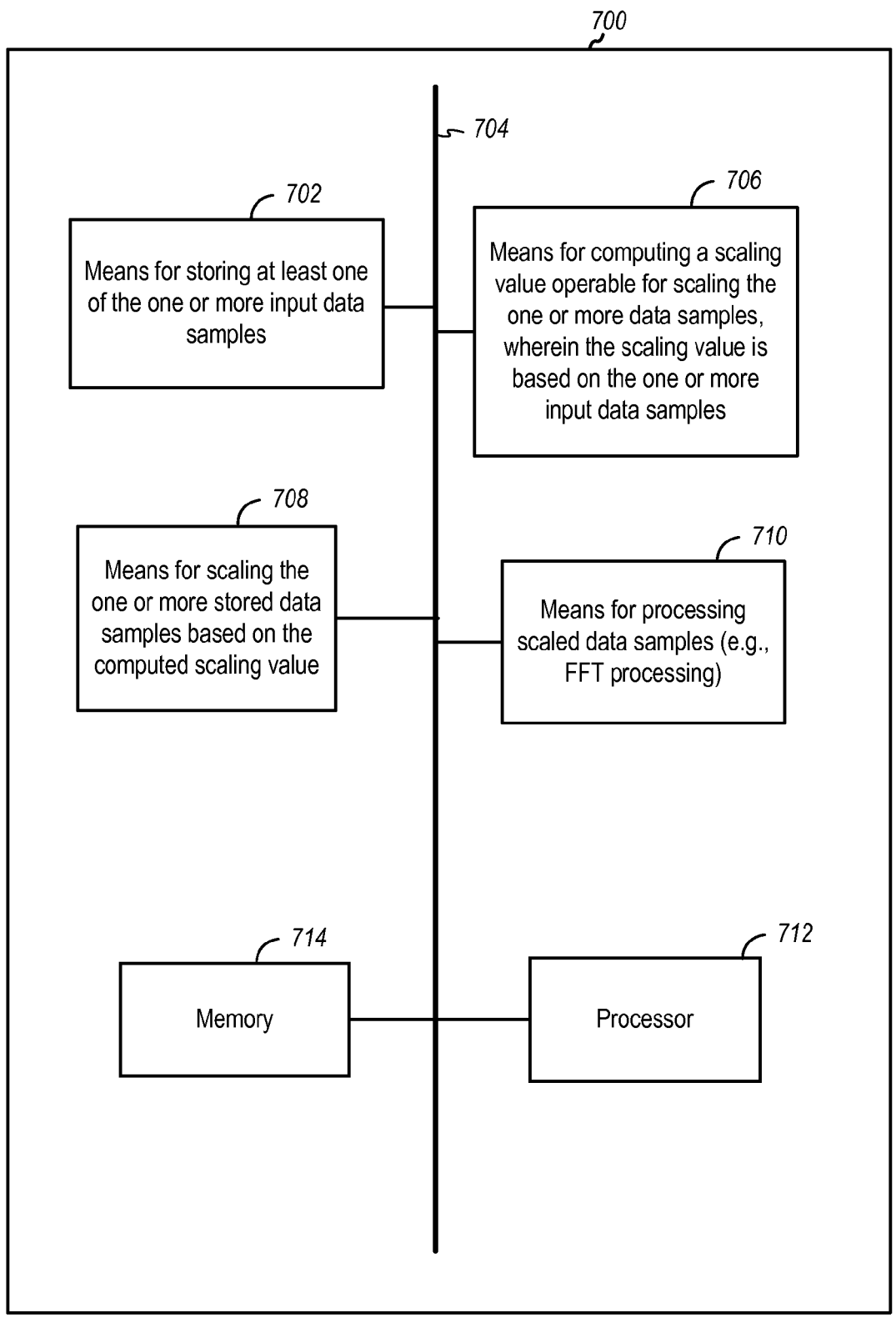
FIG. 7 is yet another block diagram of an apparatus for dynamic data-based scaling of data.

FIG. 7 illustrates another apparatus 700 that may be utilized for dynamic data-based scaling of data. Apparatus 700 may be implemented as hardware, software, or any combination thereof. Additionally, apparatus 700 may be embodied as multiple modules or means, or implemented by at least one processor in conjunction with memory.

Apparatus 700 includes a means for storing at least one of the one or more input data samples 702. It is noted that in one example, this means by be implemented by RAM 312, 410, and 504, and may also include a multiplexer such as 306, 404 to select between an external load and a fed back output of a processing function. Apparatus 700 further includes a communication coupling 704 shown to illustrate communication between the various modules or means.

A means 706 receives the data samples and is configured for computing a scaling value operable for scaling the one or more data samples, wherein the scaling value is based on the one or more input data samples. Means 706 may be embodied as a computation unit, such as units 316 or 412, or computation 514. Additionally, means 706 may include a shift computation such as units 320 or 516 in the case of utilizing binary shift for dividing (or multiplying). Based on the value computed by means 706, a means 708 scales the one or more stored data samples based on the computed scaling value. Means 708 may be implemented by shift units 318 or 518, or alternatively by a multiplier as in the example of FIG. 4.

Apparatus 700 also includes a means 710 for processing scaled data samples, such as FFT processing, or as discussed any other recursive or iterative type processing where computed results are staged or fed back to save resources. Additionally, the apparatus 700 may include a processor 712 and a memory 714 that, among other things, may store code executable by a processor and also store the data samples.

One skilled in the art will appreciate that the presently disclosed methods and apparatus, by providing a dynamic data-based scaling of data, afford optimization of the bit width to a processing operation, such as an FFT. The disclosed scaling of data based on the latest input data, not only ensures that the data fits within a predefined bit width, but also allows that if the latest input data sample already fits within the bit width limit, that no scaling need be performed on that sample. This dynamic scaling is thus advantageous over more conventional schemes such as a static scaling of data read out of the RAM, in the case of an iterative FFT. The dynamic scaling ensures also that every bit of a data sample is being used in a meaningful way in the processing, while economizing processing resources. Of further note, the present apparatus and methods may also include expanding a signal or scaling up when the input signal is smaller than the predefined bit width.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

While, for purposes of simplicity of explanation, the disclosed methodologies are shown and described herein as a series or number of acts, it is to be understood that the processes described herein are not limited by the order of acts, as some acts may occur in different orders and/or concurrently with other acts from that shown and described herein. For example, those skilled in the art will appreciate that a methodology could alternatively be represented as a series of inter-related states or events, such as in a state diagram. Moreover, not all illustrated acts may be required to implement a methodology in accordance with the subject methodologies disclosed herein.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The description of the disclosed examples is provided to enable any person skilled in the art to make or use the presently disclosed apparatus and methods. Various modifications to these examples will be readily apparent to those skilled in the art, and the generic principles defined herein may be applied to other examples without departing from the spirit or scope of the invention. Thus, the present disclosure is not intended to be limited to the examples shown herein but is to be accorded the widest scope consistent with the principles and novel features disclosed herein.

What is claimed is:

1. A data based scaling apparatus comprising:
an input for receiving one or more data samples;
a storage device configured to store at least one of the one or more input data samples;
a scaling computation unit configured to compute a scaling value operable for scaling the one or more data samples, wherein the scaling value is based on the one or more input data samples; and
a scaling unit configured to scale the one or more data samples read out of the memory device based on the computed scaling value computed from the input one or more data samples; wherein said scaling computation unit is configured to compute the scaling value based on a determined maximum value of the one or more data samples and a predefined maximum data size, wherein the scaling value is computed to ensure that the scaled data is equal to or below the predefined maximum data size to minimize the bit width of the data path.

2. The data based scaling apparatus as defined in claim 1 further comprising:
a processing unit configured to process the scaled one or more data samples according to a predetermined processing having a known scaling factor.

3. The data based scaling apparatus as defined in claim 2, wherein the processing unit comprises an FFT unit.

4. The data based scaling apparatus as defined in claim 1, wherein the scaling unit is configured to bit shift the one or more data samples read out of the memory unit to scale the samples based on the computed scaling value.

5. The data based scaling apparatus as defined in claim 4, wherein the scaling unit utilizes power of two (2) scaling.

6. The data based scaling apparatus as defined in claim 4, wherein the scaling computation unit is further configured to compute a maximum value of the maximum of absolute values of both real and imaginary portions of the one or more data samples in computing the scaling value operable for scaling the one or more data samples.

7. The data based scaling apparatus as defined in claim 6, wherein the scaling computation unit is further configured to compute the scaling value as a minimum bit shift number to be used by the bit shift unit to bit shift the one or more data samples to ensure that the scaled data is equal to or below a predefined maximum data size.

8. A method for data-based scaling comprising:
storing at least one of the one or more input data samples;

computing a scaling value operable for scaling the one or more data samples, wherein the scaling value is based on the one or more input data samples; and scaling the one or more stored data samples based on the computed scaling value; wherein computing a scaling value includes computing the scaling value based on a determined maximum value of the one or more input data samples and a predefined maximum data size, wherein the scaling value is computed to ensure that scaling produces scaled data equal to or below the predefined maximum data size to minimize the bit width of the data path.

9. The method as defined in claim 8 further comprising:
processing the scaled one or more data samples according to a predetermined processing having a known scaling factor.

10. The method as defined in claim 9, wherein the predetermined processing is an FFT calculation.

11. The method as defined in claim 8, wherein scaling the one or more stored data samples includes performing bit shifting on the one or more data samples based on the computed scaling value.

12. The method as defined in claim 11, wherein the scaling is performed utilizing power of two (2) scaling.

13. The method as defined in claim 11, wherein computing the scaling value includes computing a maximum value of the maximum of absolute values of both real and imaginary portions of the one or more data samples.

14. The method as defined in claim 13, wherein computing the scaling value includes computing the scaling value as a minimum bit shift number to be used by the bit shift unit to bit shift the one or more data samples to ensure that the scaled data is equal to or below a predefined maximum data size.

15. An apparatus for data-based scaling of data comprising:
means for storing at least one of the one or more input data samples;
means for computing a scaling value operable for scaling the one or more data samples, wherein the scaling value is based on the one or more input data samples; and
means for scaling the one or more stored data samples based on the computed scaling value wherein the means for computing a scaling value includes means for computing the scaling value based on a determined maximum value of the one or more input data samples and a predefined maximum data size, wherein the scaling value is computed to ensure that scaling produces scaled data equal to or below the predefined maximum data size to minimize the bit width of the data path.

16. The apparatus as defined in claim 15 further comprising:
means for processing the scaled one or more data samples according to a predetermined processing having a known scaling factor.

17. The apparatus as defined in claim 16, wherein the predetermined processing is an FFT calculation.

18. The apparatus as defined in claim 15, wherein the means for scaling the one or more stored data samples includes means for performing bit shifting on the one or more data samples based on the computed scaling value.

19. The apparatus as defined in claim 18, wherein the means for scaling utilizes power of two (2) scaling.

20. The apparatus as defined in claim 18, wherein the means for computing the scaling value includes means for computing a maximum value of the maximum of absolute values of both real and imaginary portions of the one or more data samples.

21. The apparatus as defined in claim 20, wherein the means for computing the scaling value includes means for computing the scaling value as a minimum bit shift number to be used by the bit shift unit to bit shift the one or more data samples to ensure that the scaled data is equal to or below a predefined maximum data size.

22. A computer program product having stored thereon,
code for causing a computer to store at least one of the one or more input data samples;
code for causing a computer to compute a scaling value operable for scaling the one or more data samples, wherein the scaling value is based on the one or more input data samples; and
code for causing a computer to scale the one or more stored data samples based on the computed scaling value; wherein the code for causing a computer to compute a scaling value includes code for causing a computer to compute the scaling value based on a determined maximum value of the one or more input data samples and a predefined maximum data size, wherein the scaling value is computed to ensure that scaling produces scaled data equal to or below the predefined maximum data size to minimize the bit width of the data path.

23. The computer program product as defined in claim 22, the computer-readable medium further comprising:
code for causing a computer to process the scaled one or more data samples according to a predetermined processing having a known scaling factor.

24. The computer program product as defined in claim 23, wherein the predetermined processing is an FFT calculation.

25. The computer program product as defined in claim 22, wherein the code for causing a computer to scale the one or more stored data samples includes code for causing a computer to compute perform bit shifting on the one or more data samples based on the computed scaling value.

26. The computer program product as defined in claim 25, wherein the code for causing a computer to scale is configured to utilize power of two (2) scaling.

27. The computer program product as defined in claim 25, wherein the code for causing a computer to compute the scaling value includes code for causing a computer to compute a maximum value of the maximum of absolute values of both real and imaginary portions of the one or more data samples.

28. The computer program product as defined in claim 27, wherein code for causing a computer to compute the scaling value includes code for causing a computer to compute the scaling value as a minimum bit shift number to be used by the bit shift unit to bit shift the one or more data samples to ensure that the scaled data is equal to or below a predefined maximum data size.

29. A communication apparatus comprising:
at least one processor configured to:
receive one or more data samples and to store at least one of the one or more input data samples in a memory;
compute a scaling value operable for scaling the one or more data samples, wherein the scaling value is based on the one or more input data samples; and
scale the one or more stored data samples based on the computed scaling value; and to further compute the scaling value based on a determined maximum value of the one or more data samples and a predefined maximum data size, wherein the scaling value is computed to ensure that the scaled data is equal to or below the predefined maximum data size to minimize the bit width of the data path.

30. The communication apparatus as defined in claim 29, wherein the at least one processor is further configured to process the scaled one or more data samples according to a predetermined processing having a known scaling factor.

31. The communication apparatus as defined in claim 30, wherein the predetermined processing is FFT calculation.

* * * * *